United States Patent [19]

Spearman

[11] 3,952,532
[45] Apr. 27, 1976

[54] UNDERWATER TRENCHING AND CABLE LAYING APPARATUS

[76] Inventor: Robert R. Spearman, 2367 Bay Circle, Lake Park, Fla. 33410

[22] Filed: Apr. 23, 1975

[21] Appl. No.: 570,945

[52] U.S. Cl.................................. 61/72.4; 61/72.6; 37/83; 37/189
[51] Int. Cl.².................... E02F 5/02; B63B 35/04
[58] Field of Search.................. 61/72.4, 72.6, 72.1; 37/87, 189, 191, 83

[56] References Cited
UNITED STATES PATENTS

| | | | |
|---|---|---|---|
| 737,021 | 8/1903 | Roberts | 61/72.4 |
| 3,412,490 | 11/1968 | Reising | 37/87 |

FOREIGN PATENTS OR APPLICATIONS

| | | | |
|---|---|---|---|
| 1,138,561 | 1/1957 | France | 61/72.6 |
| 692,251 | 7/1930 | France | 61/72.4 |

*Primary Examiner*—Jacob Shapiro
*Attorney, Agent, or Firm*—Mason, Fenwick & Lawrence

[57] ABSTRACT

A sled supports a hydraulic motor drive digging wheel in the bottom of a body of water with a cable guide conduit feeding cable into the trench behind the wheel; hydraulic cylinders adjust the depth of the trench with all means being controlled from a support barge or the like providing hydraulic power and control fluid.

11 Claims, 9 Drawing Figures

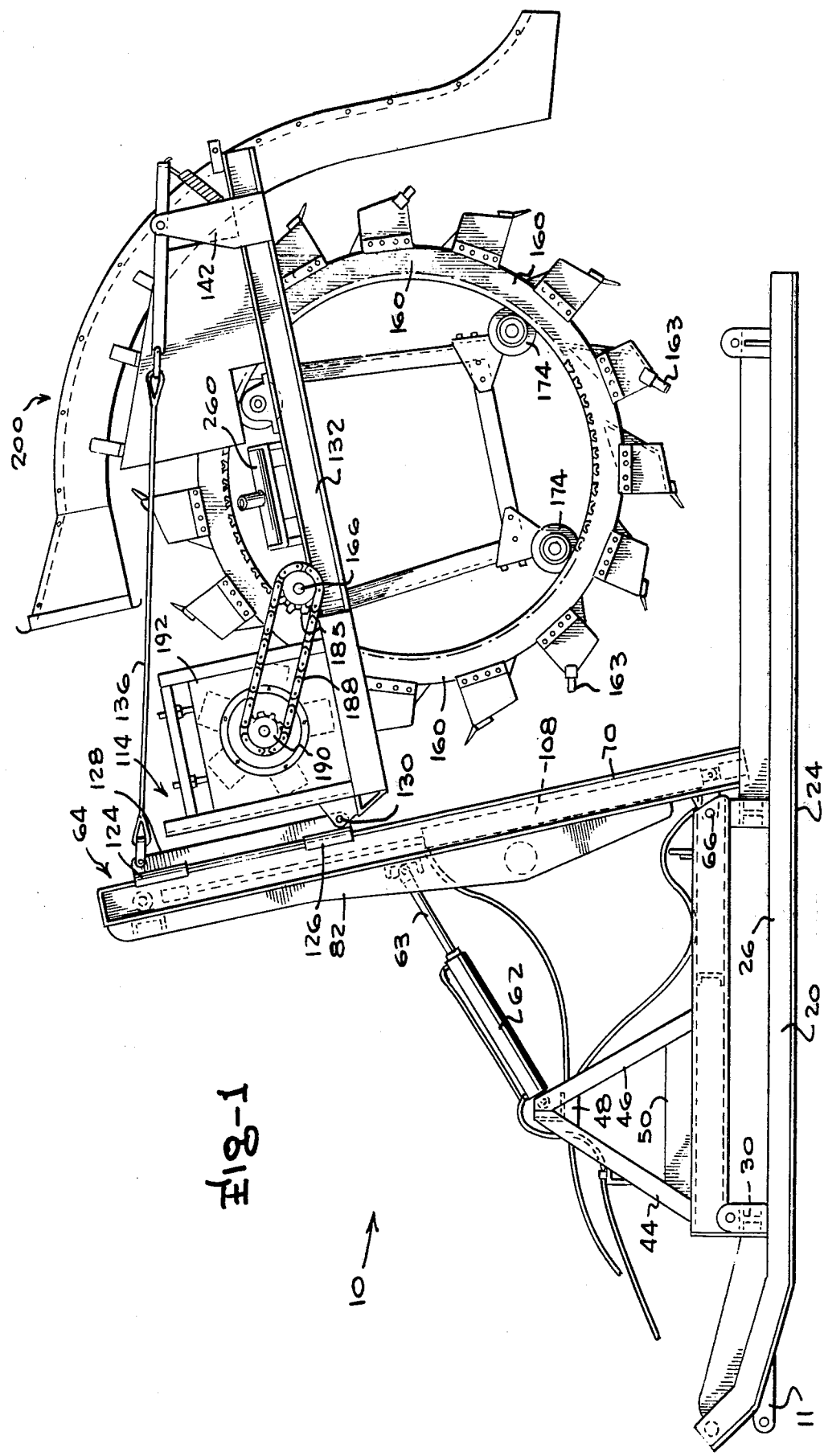

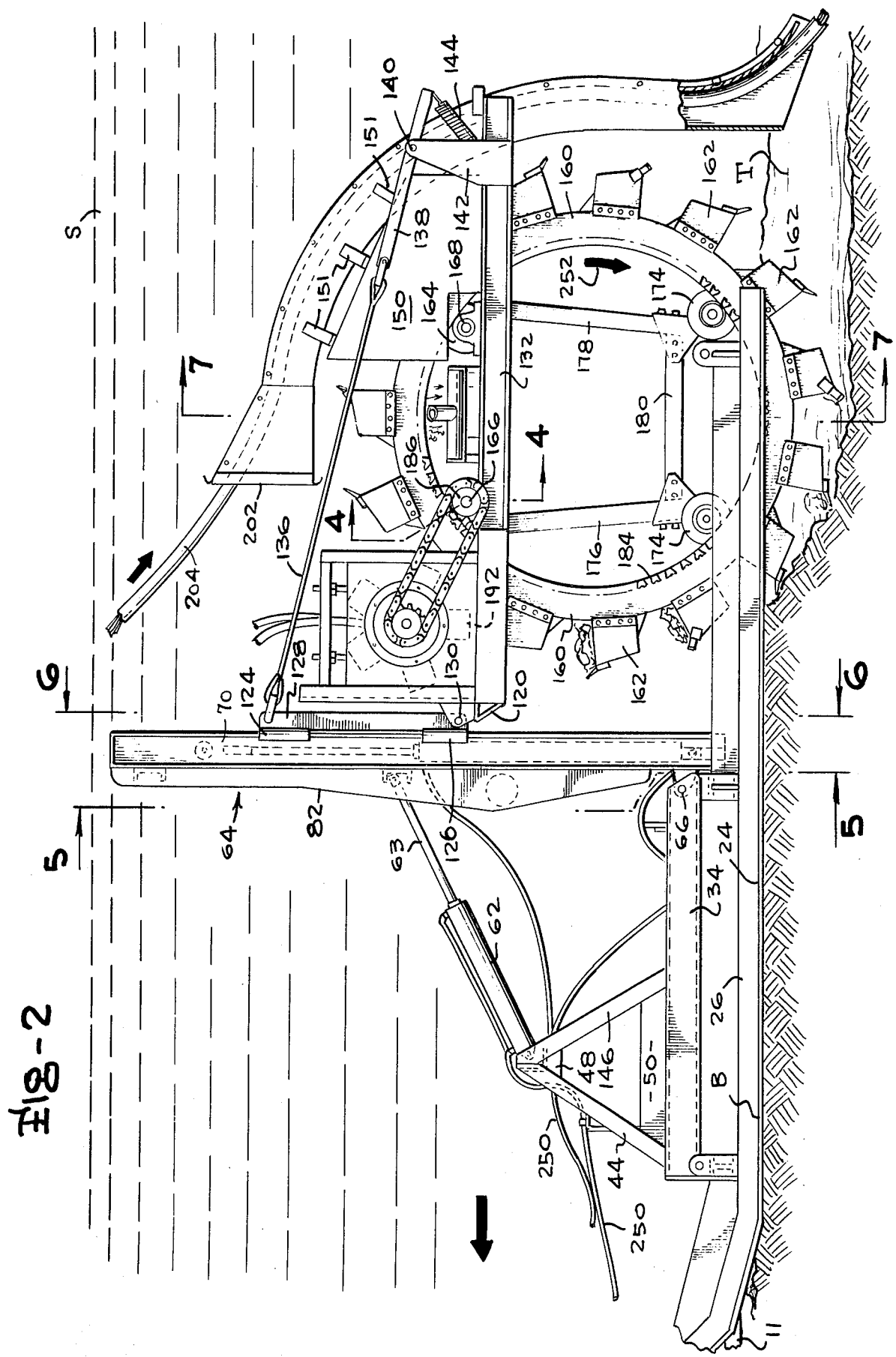

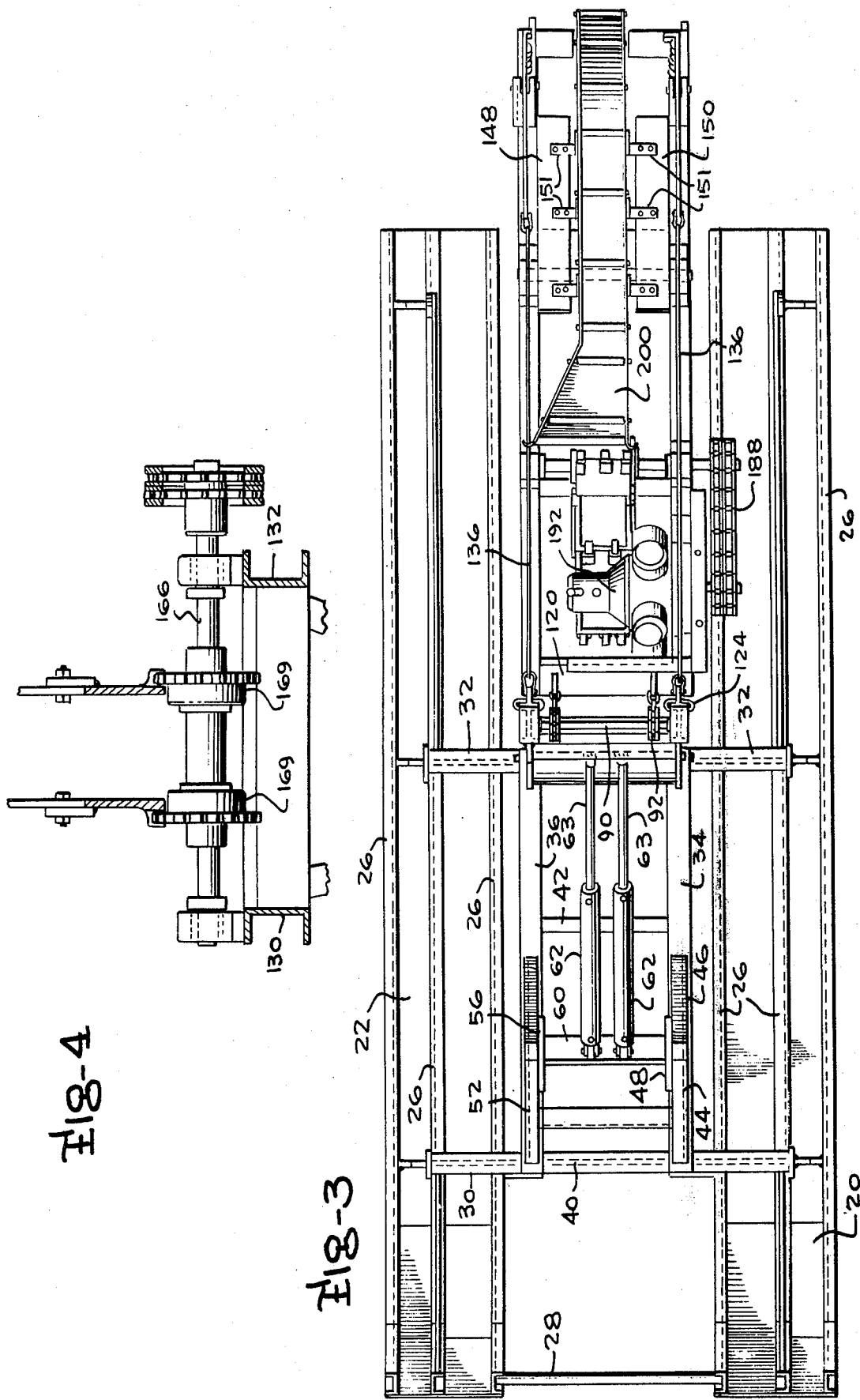

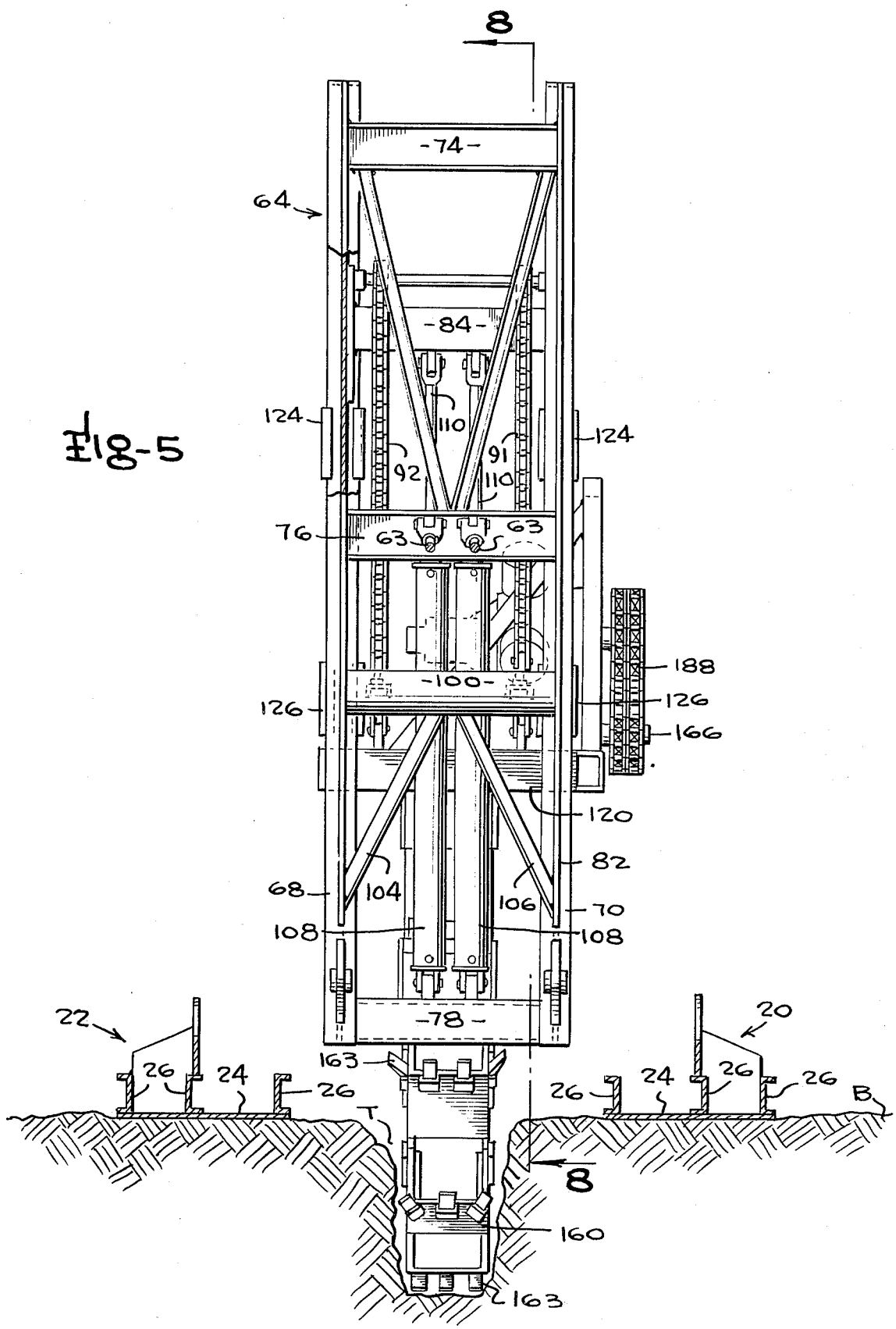

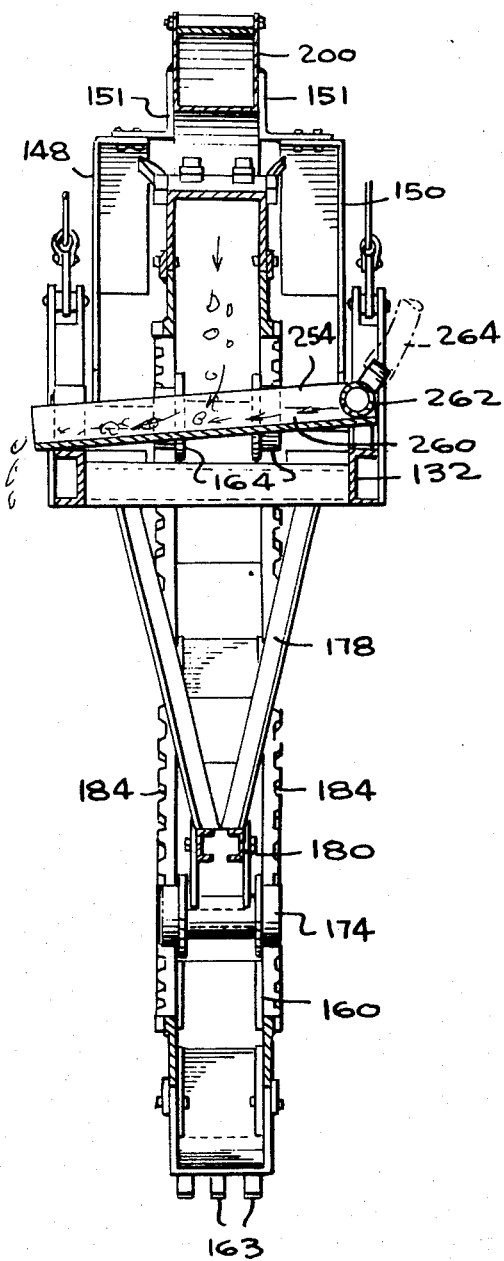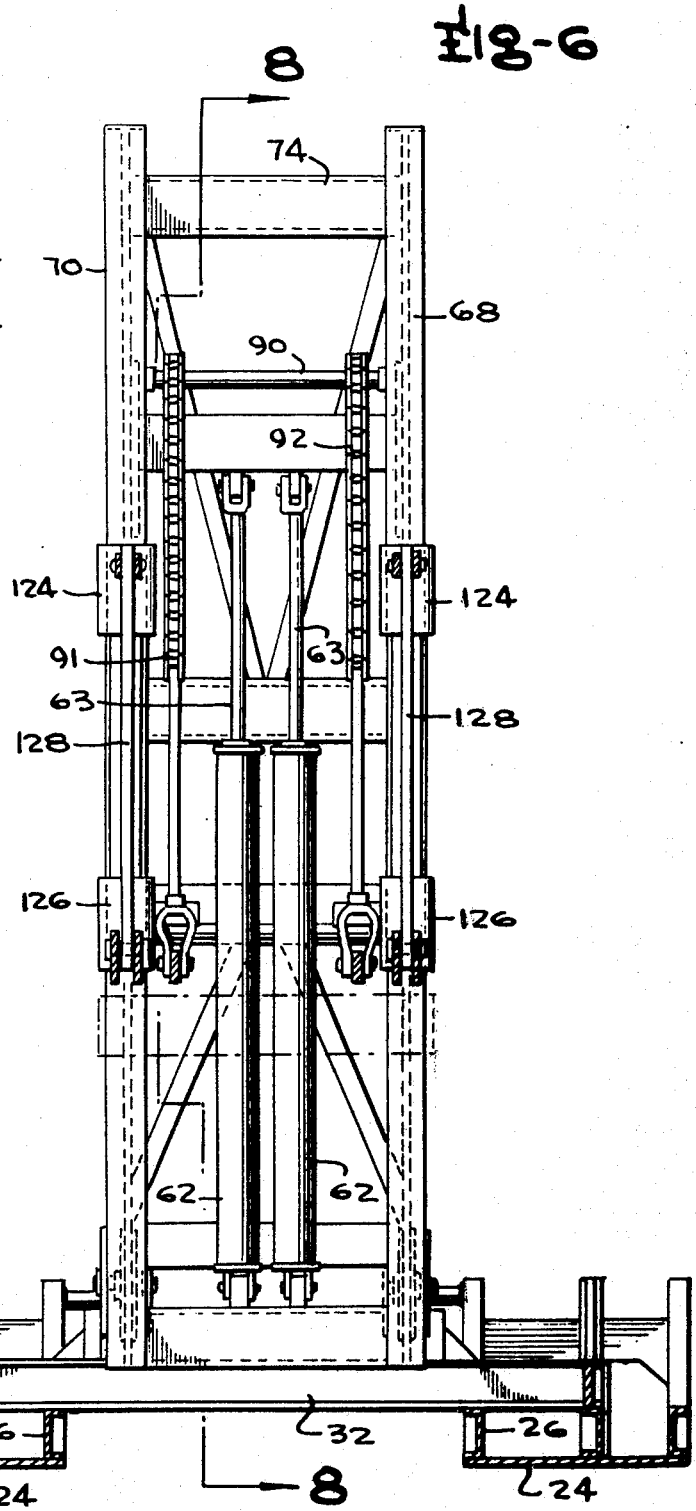

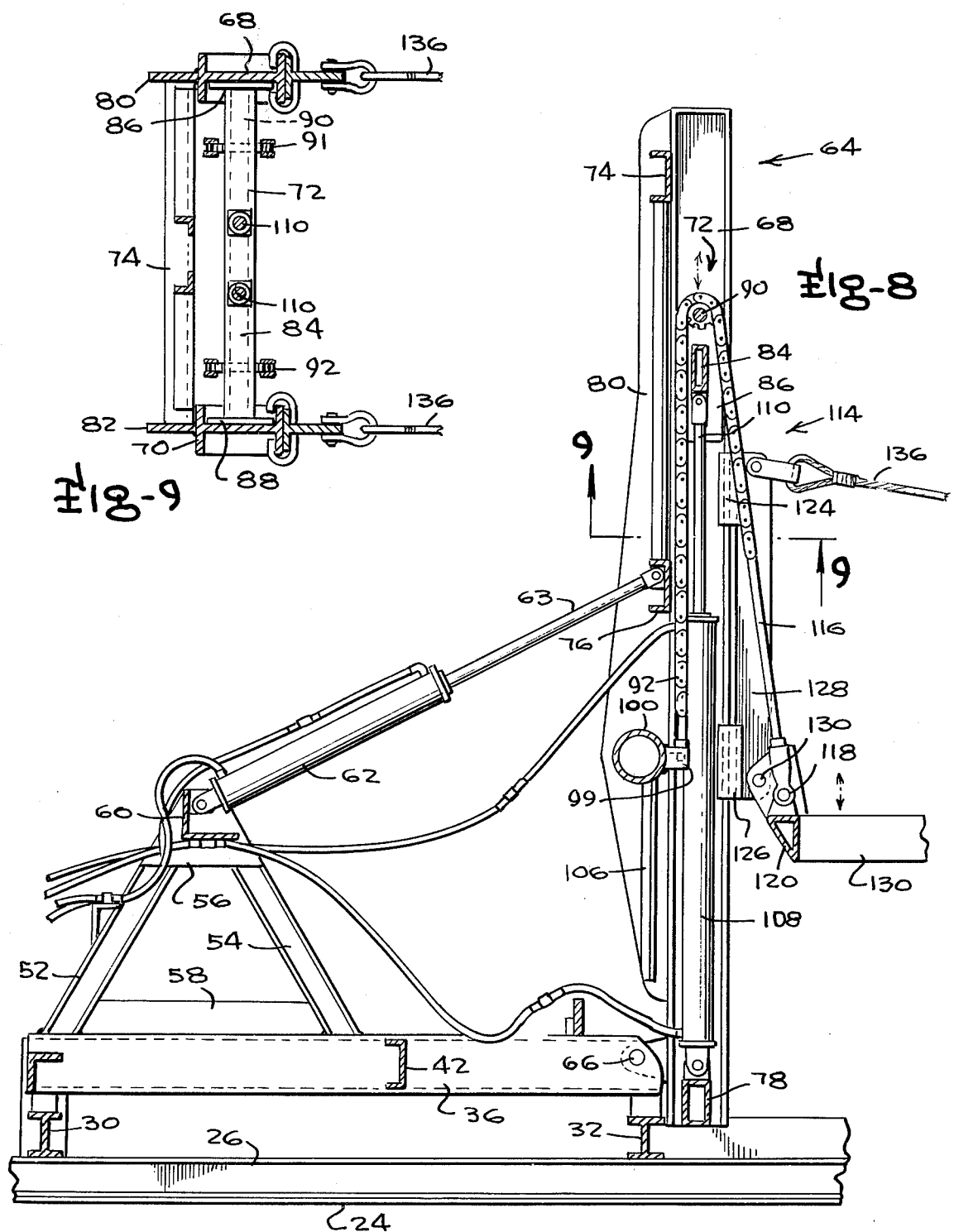

UNDERWATER TRENCHING AND CABLE LAYING APPARATUS

This invention is in the field of cable laying equipment and is specifically directed to apparatus capable of digging an underwater trench and positioning a cable in the underwater trench formed by the apparatus.

Prior known underwater cable laying devices have suffered from a number of disadvantages and shortcomings which have rendered the usage of such equipment difficult, expensive and frequently impossible. For example, prior known devices have employed fixed plow-like members mounted on sleds or other supporting vehicles for movement across the bottom of the body of water in which the cable is to be laid with many of these devices additionally incorporating hydraulic jets or the like as exemplified in Niederer Pat. No. 3,638,439 for aiding in the removal of the earth to provide a trench in which the cable can be positioned. While devices of the foregoing type can effectively lay a cable in some environments, they are totally ineffective in difficult areas in which there are substantial rock formations, roots, debris or other material to block movement of the plow through the soil. Devices of the foregoing type will frequently contact roots, rocks or other obstacles in the soil and ride and move upwardly so that the trench becomes shallow or nonexistent and the cable is near or on the surface of the bottom of the body in which the device is being operated and is in consequent danger of subsequent damage. Moreover, having an underwater cable resting on sharp objects such as rocks or other material over which it extends frequently results in subsequent damage to the cable. The foregoing problems are made all the more acute by virtue of the fact that such misadventures are frequently undiscovered by the operators at the time the cable is being laid and are not discovered until the cable is subsequently damaged.

Therefore, it is the primary object of this invention to provide a new and improved cable laying apparatus capable of usage on the bottom of a body of water.

A further object of this invention is the provision of cable laying means including mechanical digging means for providing a trench for a cable in the bottom of a body of water.

Achievement of the foregoing objects is enabled in the preferred embodiment of the invention by the provision of a sled member consisting of a pair of spaced parallel skids capable of movement across the bottom of the body of water and providing support for the remaining components of the apparatus. An elongated guide support frame member is mounted for pivotal movement about a transverse axis on the sled and provides support for a plurality of slide members which in turn support a digging wheel in the space between the skid members. The vertical guide support is capable of pivotal movement for lifting the digging wheel from contact with the surface on which the skids are positioned. Hydraulic motor means mounted on the digging wheel support frame is provided for rotating the digging wheel during an excavating operation with the depth of the trench being dug being adjustable by vertical adjustment of the support frame on which the wheel is mounted. A cable guide chute is positioned so as to effectively guide the cable into the lower portion of the trench being dug by the operation of the wheel. The depth of the trench can be adjusted by hydraulic cylinder means mounted on the guide support frame to adjust the relative vertical position of the wheel relative to the sled to provide an accurate depth for the trench being dug by the apparatus.

A better understanding of the preferred embodiment will be enabled when the following written description is considered in conjunction with the appended drawings in which:

FIG. 1 is a side elevation of the preferred embodiment of the invention with the digging and cable laying apparatus being in an elevated position;

FIG. 2 is a side elevation of the invention illustrating the mechanical digging means and the cable guide means in a lowered position of adjustment during a digging operation;

FIG. 3 is a top plan view of the preferred embodiment;

FIG. 4 is a sectional view taken along lines 4—4 of FIG. 2;

FIG. 5 is a sectional view taken along lines 5—5 of FIG. 2;

FIG. 6 is a sectional view taken along lines 6—6 of FIG. 2;

FIG. 7 is a sectional view taken along lines 7—7 of FIG. 2;

FIG. 8 is a sectional view taken along lines 8—8 of FIG. 5; and

FIG. 9 is a sectional view taken along lines 9—9 of FIG. 8.

Attention is initially invited to FIG. 1 of the drawings which illustrates the preferred embodiment, generally designated 10, which consists of a vehicle in the form of a sled capable of movement across the bottom B of a body of water when towed by a towing cable or the like attached to connector means 11 on its forward end. The sled comprises first and second skid members 20 and 22 which are turned upwardly at their forward ends and each of which includes a base plate 24 and a plurality of longitudinally extending channel frame members 26 welded to the upper surface of the base plate.

The skids 20 and 22 are joined at their forward ends by a transversely extending frame member 28 with first and second transverse equipment support beams 30 and 32 also being welded to the skid members to provide a rigid sled construction as shown in FIG. 3. The transverse equipment support beams 30 and 32 provide support for longitudinal frame members 34 and 36 welded to their upper surfaces. Transverse frame members 40 and 42 are welded between the longitudinal frame members 34 and 36 as best illustrated in FIG. 3 and upwardly inclined frame members 44 and 46 are welded to the upper surface of the longitudinal frame members 34 and have their upper ends welded together along with a gusset plate 48 with their lower ends being joined by reinforcing plate 50. Similarly, upwardly inclined frame members 52 and 54, which are identical to frame members 44 and 46, are welded to the upper surface of the longitudinal frame member 36 and have their upper ends welded together to a gusset plate 56 identical to gusset plate 48. The lower ends of the frame members 52 and 54 being welded to a reinforcing plate 58 identical to reinforcing plate 50. A relatively heavy angle member 60 is welded between the gusset plates 48 and 56 and provides pivotal support for the base end of a pair of hydraulic cylinders 62 as best illustrated in FIGS. 3 and 8.

The piston rod 63 of each of the cylinders 62 is connected on its outer end to a pivotable slide guide frame member generally designated 64 which is mounted for pivotal movement about a pivot means 66 oriented transversely with respect to the sled. Pivotable slide guide frame member 64 includes side frame members 68 and 70 each of which comprises an I-beam defining a trackway in which a slide member 72 is mounted for reciprocation. Side frame members 68 and 70 are connected by an upper channel member 74 and an intermediate channel member 76 welded to their front face with the piston rods 63 being connected to pivot brackets on the intermediate channel member 76 as best shown in FIG. 8. A box frame member 78 is welded to the lower ends of the side frame members 68 and 70 and reinforcing flanges 80 and 82 are respectively welded to the side frame members 68 and 70 on their front faces. Slide member 72 consists of a transverse box beam 84 to the ends of which slide plates 86 and 88 of a width to be matingly received between the flanges of side frame members 68 and 70 are welded. A shaft 90 extends between the slide plates 86 and 88 above the box frame 84 and supports idler sprockets over which chains 91 and 92 extend.

The lower ends of the chains 91 and 92 are connected to brackets 99 on a transverse frame member 100 extending between the flanges 80 and 82 and reinforced by diagonal members 104 and 106 as best illustrated in FIGS. 5 and 8. A pair of hydraulic cylinders 108 have their base ends pivotally connected to the lower box frame member 78 as illustrated in FIG. 5 and have their piston rods 110 pivotally connected to the box beam 84 of the slide member 72. Actuation of the hydraulic cylinders 108 serves to move the slide member 72 upwardly or downwardly along the length of the pivotable slide guide 64 in an obvious manner.

Chains 91 and 92 are connected on their ends opposite the connection to the transverse frame 100 to a digging means support slide generally designated 114 (FIG. 8) mounted for reciprocation on the rear flange of the side frame members 68 and 70 of the pivotable slide guide 64. Chains 91 and 92 are connected to adjustable rods 116 the lower ends of which are connected to a pivot 118 on a bottom frame member 120 at the forward end of the digging means support slide.

The digging means support slide 114 includes a pair of upper slide sleeves 124 and a pair of lower flange slide sleeves 126 for guiding movement of slide 114 on side frames 68 and 70. The upper slide sleeve 124 is joined to the lower slide sleeve 126 by a rigid plate 128 welded to both of the slide sleeves as best illustrated in FIG. 6 with the bottom frame member 120 being connected to pivot means 130 on the rigid plates 128. Side frame members 132 and 134 have their front ends welded to the bottom frame element 120 and are connected across their rearmost portions by a cable guide conduit 200 mounted on vertical frame plates 148 and 150 (FIG. 7) to the upper surfaces of which brackets 151 provide connection to the cable guide conduit.

FIG. 1 illustrates the digging wheel and its associated support means along with the cable guide means in an uppermost position on the pivotable slide guide frame 64 by virtue of the fact that the cylinders 108 are in their fully extended position. Additionally, the cylinders 62 are contracted somewhat to tilt the pivotable slide guide 64 forwardly at its upper end. The position illustrated in FIG. 1 is a non-operative position employed while transporting the device from one location to another.

FIG. 2 illustrates the device in an operating condition digging a trench T in the bottom of a body of water which can have a surface S far above the device. Hydraulic power and control fluid is provided by lines 250 extending to a supporting vessel such as a barge or the like so that the wheel 160 can be rotated in the direction of arrow 252 to effect a digging operation. As the wheel rotates to an upper position, the material in the buckets 262 passes over a washout trough 254 into which the lumps of material fall and are washed outwardly of the apparatus by means of a jet of water 260 from a pipe 262 connected to a hose 264 supplying pressurized water. Consequently, the material dug from the trench is washed outwardly to the side of the apparatus and forward movement of the device effected by a towing cable or the like hooked to towing brackets 11 on the front end of the sled to result in the digging of a trench T into which the cable 204 is positioned as will be obvious from inspection of FIG. 2.

Numerous modifications of the subject invention will undoubtedly occur to those of skill in the art and it should be understood that the spirit and scope of the invention is to be limited solely by the appended claims.

I claim:

1. An underwater excavating means for digging a trench in the bottom of a body of water comprising:
   a supporting vehicle capable of movement across the bottom of a body of water,
   mechanical digging means capable of underwater operation including a power driven rotary digging wheel,
   adjustable support means supporting said rotary digging wheel for rotation about a horizontal axis and for vertical adjustment with respect to said vehicle, and hydraulic motor means mounted on said adjustable support means drivingly connected to said rotary digging wheel for rotating said digging wheel.

2. The invention of claim 1 additionally including hydraulic cylinder means for effecting positioning of said support frame means at a desired position of adjustment on said guide support member.

3. The invention of claim 2 additionally including hydraulic cylinder means connected between said sled means and said elongated guide support member for pivotally positioning said elongated guide support member in a desired adjusted pivotal position about said transverse axes.

4. The invention of claim 1 wherein said vehicle comprises sled means.

5. The invention of claim 1 additionally including means for receiving and guiding a cable into the trench immediately rearward of said rotary digging wheel.

6. The invention of claim 4 wherein said sled means includes first and second parallel spaced skids; and
   said adjustable support means includes an elongated guide support member mounted for pivotal movement about a transverse axis above said parallel skids; and
   adjustable support frame means mounted for adjustable movement along the length of said guide support member; and
   bearing means on said adjustable support frame means supporting said digging wheel for rotation about a horizontal axis thereon.

7. The invention of claim 6 additionally including a cable guide means positioned rearwardly of said digging wheel on said adjustable support frame means for guiding a cable into a trench formed by said digging wheel.

8. The invention of claim 6 additionally including hydraulic cylinder means for effecting positioning of said support frame means at a desired position of adjustment on said guide support member.

9. The invention of claim 8 additionally including hydraulic cylinder means connected between said sled means and said elongated guide support member for pivotally positioning said elongated guide support member in a desired adjusted pivotal position about said transverse axes.

10. The invention of claim 9 additionally including a cable guide means positioned rearwardly of said digging wheel on said adjustable support frame means for guiding a cable into a trench formed by said digging wheel.

11. An underwater trenching and cable laying means comprising first and second skid means spaced apart in parallel relation, frame means fixedly connecting said skid means to provide a unitary rigid structure, a generally vertically extending slide guide means, pivot means mounting said slide guide means adjacent its lower end to said rigid frame means, hydraulic cylinder means connected between said rigid frame means and an upper portion of said pivotable slide guide means for pivoting said slide guide means to a desired angle of orientation, a slide member mounted for reciprocation along the length of said slide guide means, hydraulic power means for selectively positioning said slide means at a desired position along the length of said slide guide means, a digging wheel support frame mounted on said slide member, a rotary digging wheel mounted on said digging wheel support frame for rotation, hydraulic motor means mounted on said digging wheel support frame for rotating said digging wheel and cable guide means extending downwardly to the rear of said rotary digging wheel for guiding a cable into a trench formed by said rotary digging wheel.

* * * * *